(12) United States Patent
Tanaka et al.

(10) Patent No.: US 7,821,596 B2
(45) Date of Patent: Oct. 26, 2010

(54) LAMP UNIT AND LIQUID CRYSTAL DISPLAY DEVICE

(75) Inventors: Mitsuru Tanaka, Osaka (JP); Yuto Suzuki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 100 days.

(21) Appl. No.: 12/242,973

(22) Filed: Oct. 1, 2008

(65) Prior Publication Data

US 2009/0091684 A1    Apr. 9, 2009

(30) Foreign Application Priority Data

Oct. 4, 2007    (JP)    ............................. 2007-260540

(51) Int. Cl.
*G02F 1/1335*    (2006.01)
*F21V 7/04*    (2006.01)

(52) U.S. Cl. ............................. 349/62; 349/56; 349/60; 362/611; 362/97.1

(58) Field of Classification Search .................. 349/62, 349/58, 56, 60, 113; 362/97.1, 97.2, 97.3, 362/97.4, 611
See application file for complete search history.

(56) References Cited

U.S. PATENT DOCUMENTS

| | | | | |
|---|---|---|---|---|
| 5,537,296 A | * | 7/1996 | Kimura et al. ............... | 362/634 |
| 5,886,758 A | * | 3/1999 | Ibaraki ......................... | 349/58 |
| 5,886,759 A | * | 3/1999 | Mashino et al. ............... | 349/65 |
| 6,935,766 B2 | * | 8/2005 | Ato ............................. | 362/633 |
| 7,549,881 B2 | * | 6/2009 | Cho et al. ................... | 439/235 |
| 2006/0109689 A1 | | 5/2006 | Tanaka | |
| 2009/0091684 A1 | * | 4/2009 | Tanaka et al. ................. | 349/62 |

FOREIGN PATENT DOCUMENTS

| | | |
|---|---|---|
| JP | 2004-212574 A | 7/2004 |
| JP | 2007-207457 A | 8/2007 |

* cited by examiner

*Primary Examiner*—Brian M Healy
(74) *Attorney, Agent, or Firm*—Global IP Counselors, LLP

(57) ABSTRACT

A lamp unit for a liquid crystal display device includes a cold cathode lamp, a lamp cable, a lamp socket and a lamp reflector. The lamp cable is electrically connected to the cold cathode lamp to supply electric power to the cold cathode lamp. The lamp socket supports the cold cathode lamp and has a holder portion holding the lamp cable. The lamp reflector houses the cold cathode lamp and the lamp socket and has a bottom plate, front and rear plates that extend from the bottom plate and a pair of support tabs that extends from lateral end portions of the front and rear plates to sandwich the holder portion of the lamp socket therebetween.

12 Claims, 3 Drawing Sheets

LAMP UNIT AND LIQUID CRYSTAL DISPLAY DEVICE

CROSS-REFERENCE TO RELATED APPLICATIONS

This application claims priority to Japanese Patent Application No. 2007-260540 filed on Oct. 4, 2007. The entire disclosure of Japanese Patent Application No. 2007-260540 is hereby incorporated herein by reference.

BACKGROUND OF THE INVENTION

1. Field of the Invention

The present invention generally relates to a lamp unit. More specifically, the present invention relates to a lamp unit for a liquid crystal display device.

2. Background Information

Electronic devices, such as liquid crystal display devices provided to portable personal computers or the like, are equipped with a liquid crystal display panel and a backlight mechanism. The backlight mechanism is disposed over the liquid crystal display panel. The backlight mechanism generally includes a cold cathode unit (e.g., lamp unit) and a flat light guide plate. The cold cathode unit has a cold cathode tube as a light source. The flat light guide plate guides light from the cold cathode tube to the liquid crystal display panel. The cold cathode unit is disposed facing one end face of the light guide plate. The cold cathode unit is provided so that the light from the cold cathode unit is guided through the light guide plate to the liquid crystal display panel. The cold cathode unit further has a pair of lamp cables, a pair of lamp sockets and a metal lamp reflector. The lamp cables are electrically connected to both ends of the cold cathode tube to supply electrical power to the cold cathode tube. The lamp sockets support the ends of the cold cathode tube. The lamp sockets are mounted to the lamp reflector. The lamp reflector is formed in a reflective film type or a reflective plate type. The lamp reflector of the reflective film type has a substantially U-shaped cross section. The lamp reflector is open only on a side facing an end face of the light guide plate and surrounds the cold cathode tube (e.g., a discharge tube). The lamp reflector reflects light from the cold cathode tube on the U-shaped inner face of the reflective film to illuminate the light guide plate. The lamp reflector of the reflective plate type reflects light from the cold cathode tube by an aluminum plate or another such reflective plate to illuminate the light guide plate. The lamp reflector is provided so that light from the cold cathode tube is incident on the light guide plate either directly or after being reflected by a reflective film, and is guided to the entire liquid crystal display panel surface by the light guide plate. The liquid crystal display devices are utilized as display devices in computers, portable information terminals, portable telephones, television sets, and so forth since the liquid crystal display devices consume less power and are thinner and lighter in weight.

One of the two lamp cables connected to the cold cathode tube passes through a rear side of the lamp reflector (the side where the cold cathode tube is not present). The lamp cable is routed around to the other lamp cable (the other lamp socket). The lamp cable routed in this manner is fixed on the rear side of the lamp reflector so it will not get in the way during assembly of the backlight mechanism, etc. The following means is employed for this fixing.

For example, with one commonly employed means, the lamp cable is fixed to the rear side of the lamp reflector by adhesive tape (such as double- or single-sided tape). Furthermore, a plastic cable holder is attached to the rear side of the lamp reflector to fix the lamp cable to the cable holder. However, this means requires a new member (the cable holder), and therefore increases the number of parts, and furthermore, requires the work of attaching the cable holder. Thus, more processing time is entailed, and this drives up the cost.

Japanese Laid-Open Patent Application Publication No. 2004-212574 discloses a technique of providing a means for fixing a lamp cable to a lamp socket. The technique of Japanese Laid-Open Patent Application Publication No. 2004-212574 will now be described.

A lamp socket is mated to a lamp reflector. A lamp cable is supported by a protrusion provided to the lamp socket. A cold cathode tube is inserted into and supported by a rear face of an insertion hole on an inner face side of the lamp socket mated to the lamp reflector. The lamp cable is connected to one end of the cold cathode tube from the opposite side as the insertion hole and is routed to a rear face side of the lamp reflector. The lamp cable is inserted and supported in an opening. A convex component is provided to the opening of the protrusion on an outside of the opening. The lamp socket is made from rubber, silicone, or another such elastic material. Thus, when the lamp cable is inserted into the lamp socket, the opening is held open by elastic force. When the lamp cable has been housed on the convex component, the opening is closed again by the elastic force. This configuration prevents the lamp cable from coming out of the opening.

With the technique described in Japanese Laid-Open Patent Application Publication No. 2004-212574, the lamp cable is prevented from falling out by providing the convex component to the opening of the protrusion. However, since the protrusion sticks out from the lamp reflector, the opening opens up after the elastic material of the lamp socket changes and deteriorates over time. As a result, the lamp cable comes loose. In particular, in recent years there is more concern about environmental issues. When parts are replaced in a liquid crystal display device, rather than replacing an entire backlight mechanism, the user replaces just the lamp and the lamp cable connected to the lamp. These parts are the parts most likely to deteriorate over time and to affect brightness, which is a measure of the quality of the liquid crystal display device. Therefore, in replacing the lamp and the lamp cable, the opening for supporting the lamp cable is degraded by opening and closing every time the lamp cable is pushed into and pulled out of the lamp socket, and ends up being opened further. The opening is further opened up by changes over time to the material of the lamp socket. Thus, the lamp cable comes loose from the opening. As a result, when the lamp unit is attached and removed, the lamp cable that has come out of the lamp unit contacts with the other constituent members of the backlight mechanism, and damages the backlight mechanism.

In view of the above, it will be apparent to those skilled in the art from this disclosure that there exists a need for an improved lamp unit. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a lamp unit with which fixing of a lamp cable can be accomplished securely.

In accordance with one aspect of the present invention, a lamp unit for a liquid crystal display device includes a cold cathode lamp, a lamp cable, a lamp socket and a lamp reflector. The lamp cable is electrically connected to the cold cathode lamp to supply electric power to the cold cathode lamp. The lamp socket supports the cold cathode lamp and has a holder portion holding the lamp cable. The lamp reflector houses the cold cathode lamp and the lamp socket and has a bottom plate, front and rear plates that extend from the bottom plate and a pair of support tabs that extends from lateral end portions of the front and rear plates to sandwich the holder portion of the lamp socket therebetween.

With the lamp unit of the present invention, it is possible to provide a lamp unit with which fixing of a lamp cable can be accomplished securely.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
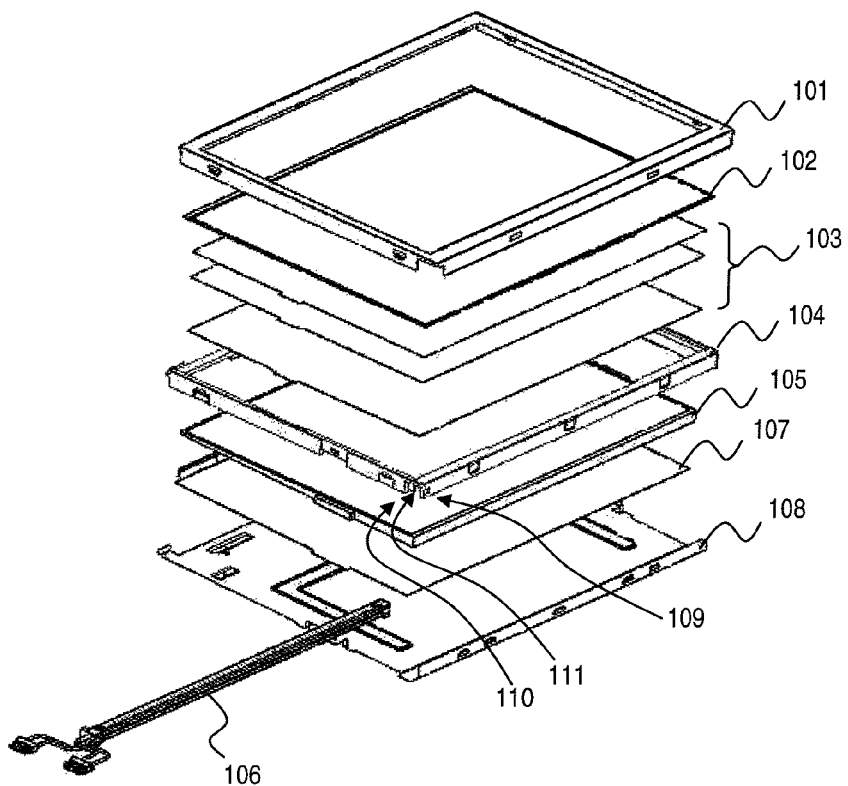
FIG. 1 is an exploded perspective view of a liquid crystal display device in accordance with one embodiment of the present invention.
Figure 2:
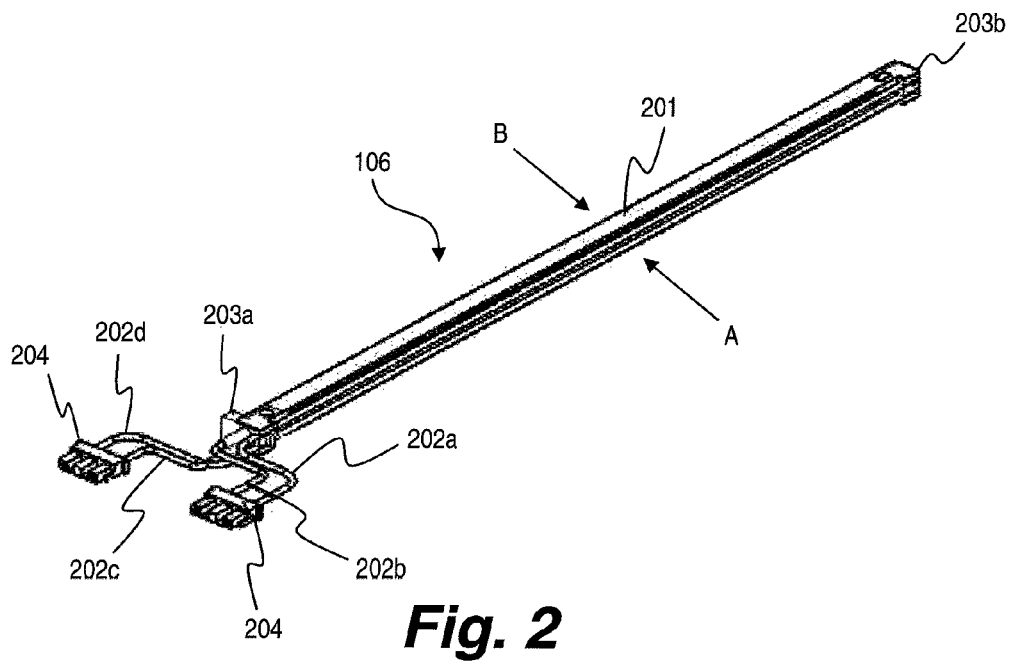
FIG. 2 is a perspective view of a lamp unit of the liquid crystal display device illustrated in FIG. 1.
Figure 3:
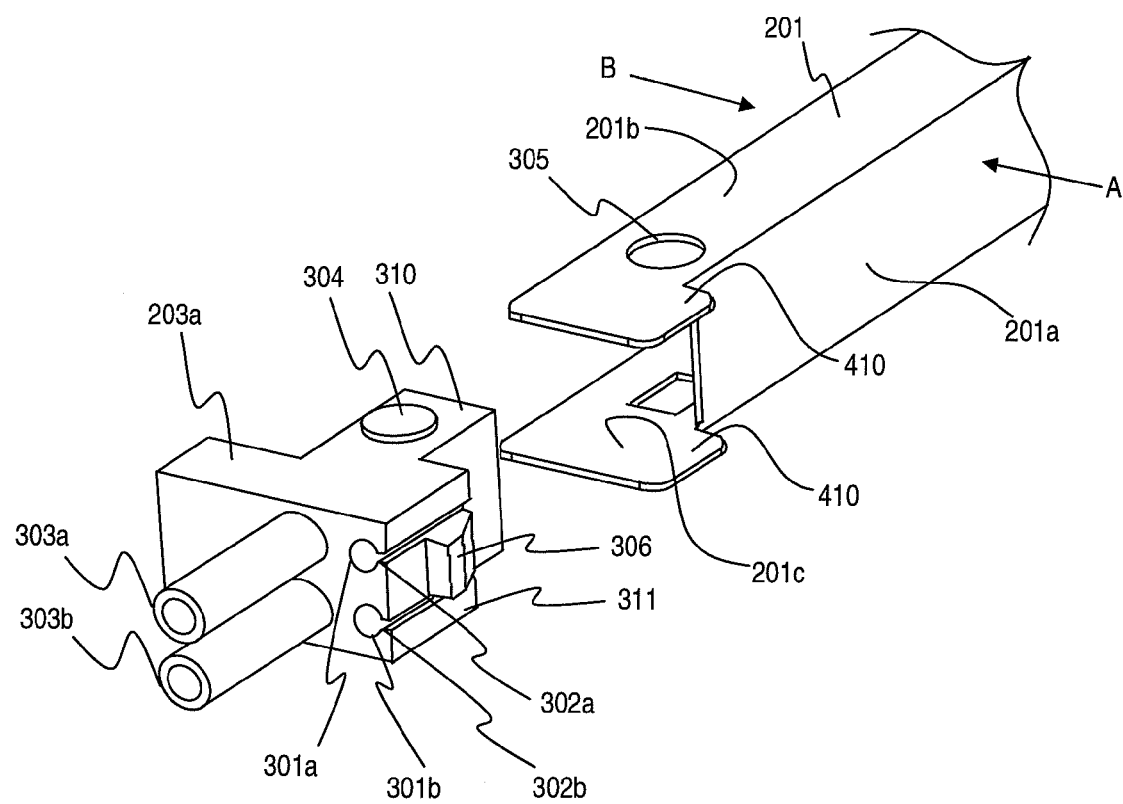
FIG. 3 is a detailed exploded perspective view of the lamp unit illustrated in FIG. 2.
Figure 4:
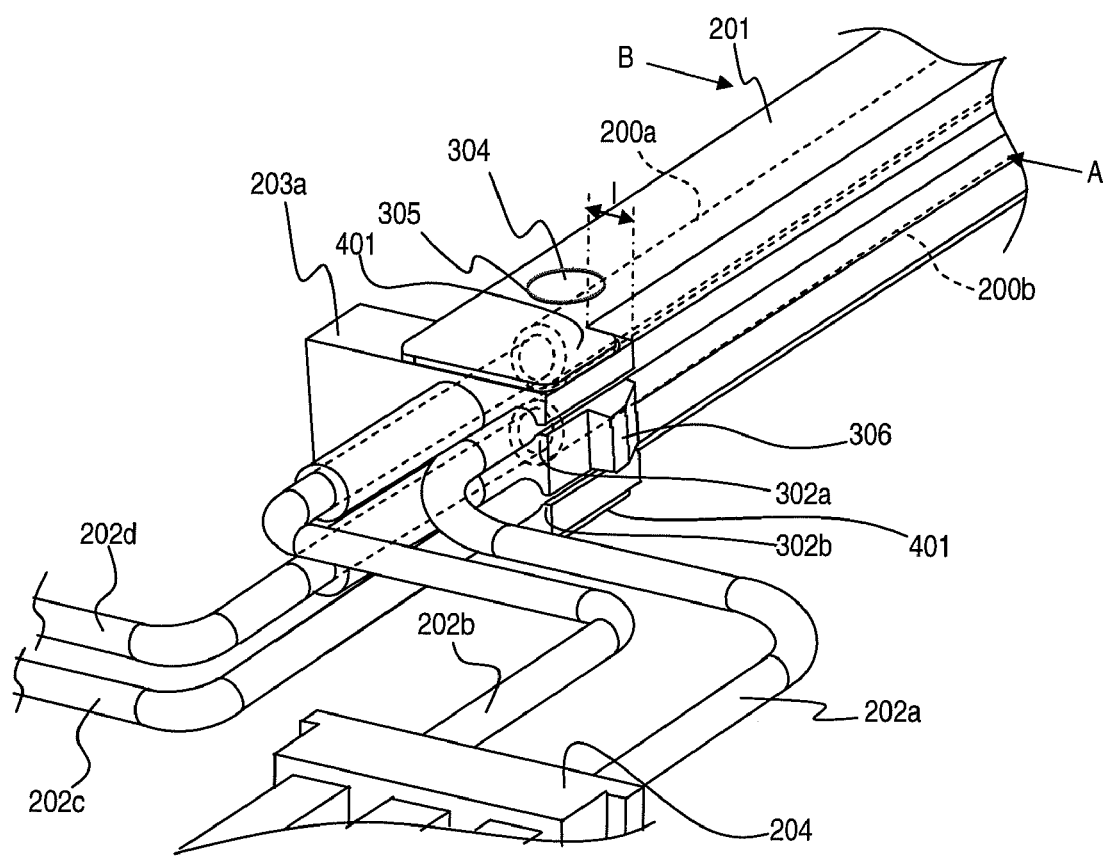
FIG. 4 is a detailed perspective view of the lamp unit illustrated in FIG. 2.

FIG. 1 is an exploded perspective view of a liquid crystal display device. The liquid crystal display device includes, in order from above in FIG. 1, a bezel 101, a liquid crystal display element 102, a plurality of optical sheets 103, a frame (e.g., front frame) 104, a light guide plate 105, a lamp unit 106, a reflective sheet 107 and a rear frame 108. The bezel 101 serves as a cabinet portion of a front face portion of the liquid crystal display device. The bezel 101 disposed on a front side of the liquid crystal display element 102 to hold the optical sheets 103 and the liquid crystal display element 102 on the frame 104. The liquid crystal display element (e.g., liquid crystal cell, liquid crystal panel) 102 displays video. The optical sheets 103 diffuse or converge light. The optical sheets 103 includes a plurality of laminated optical sheet elements. The frame 104 supports several internal constituent members. The light guide plate 105 guides light to a light irradiation side. The lamp unit 106 emits light. As shown in FIGS. 2-4, the lamp unit 106 includes a pair of cold cathode lamps 200a and 200b, a lamp reflector (e.g., lamp frame) 201, lamp cables 202a to 202d, a pair of lamp sockets 203a and 203b and connectors 204. The reflective sheet 107 is made of a white sheet. The reflective sheet 107 reflects light emitted rearward from the lamp unit 106 to the light guide plate 105. The rear frame 108 is made of a metal sheet. The rear frame 108 supports the constituent members from the bezel 101 to the reflective sheet 107. The rear frame 108 is mated to the frame 104 or is attached by a fixing member to the frame 104, and supports the constituent members between the rear frame 108 and the frame 104. The optical sheets 103, the frame 104, the light guide plate 105, the lamp unit 106, the reflective sheet 107 and the rear frame 108 form a backlight mechanism of the liquid crystal display device.

The backlight mechanism shown in FIG. 1 is called a side light type. With the backlight mechanism, the light guide plate 105 is used to change a linear light emitted by the cold cathode lamps (e.g., linear light sources) 200a and 200b disposed on a side face (or a bottom face) of the light guide plate 105 into a planar light. The light is reflected by the reflective sheet 107 disposed on a rear face of the light guide plate 105. Then, the reflected light is diffused by the optical sheets 103 (such as diffuser sheets) disposed on a front face of the light guide plate 105. Then, the light is uniformly incident on the liquid crystal element 102. With the backlight mechanism, the reflective sheet 107 is disposed on the rear face of the light guide plate 105. The optical sheets 103 are disposed on the front face of the light guide plate 105. The lamp unit 106 is provided to the side face of the light guide plate 105. The lamp unit 106 here is provided to one of the side faces of the light guide plate 105. The lamp unit 106 is mounted to the side face of the light guide plate 105 by sliding and inserting the lamp unit 106 to a holder (e.g., lamp unit holder) 110 formed between the frame 104 and the rear frame 108. Specifically, the holder 110 includes a gap formed between the frame 104, which serves as a plastic frame of the backlight mechanism, and the rear frame 108, which serves as a rear face of the liquid crystal display device. More specifically, the holder 110 includes the gap between the frame 104 and the rear frame 108 in a direction from the front side to the rear side and between the frame 104 and the side face of the light guide plate 105 in a direction from an upper side to a lower side. The holder 110 extends in a lateral direction of the liquid crystal display device. The holder 110 foils a sliding mechanism for guiding the lamp unit 106 so that the lamp unit 106 is slidably installed into and removed from the backlight mechanism. Furthermore, the frame 104 includes a hole (e.g., access opening) 111 communicating one end of the gap and an outer side of the frame 104. The lamp unit 106 is inserted into the holder 110 through the hole 111 from the one end of the gap. The lamp unit 106 is also removed by sliding and pulling out from the one end of the gap. Thus, the lamp unit 106 can be easily installed and removed, not only during the manufacture of the liquid crystal display device, but also when the cold cathode lamps 200a and 200b has malfunctioned or been damaged, without having to remove the light guide plate 105. Also, the lamp unit 106 can be easily assembled. Furthermore, the frame 104 has a hole 109 to position and fix the lamp unit 106.

FIG. 2 is a perspective view of the lamp unit 106. The lamp sockets 203a and 203b are made of an elastic material such as rubber, silicone, or urethane. Each of the lamp sockets 203a and 203b are formed as a one-piece, unitary member. With the backlight mechanism, the linear cold cathode lamps 200a and 200b are used as a light source. The cold cathode lamps 200a and 200b are provided to the side face of the light guide plate 105. Thus, the backlight mechanism is called an edge-lighted type backlight mechanism. The lamp unit 106 is disposed such that a light emitting side of the lamp unit 106 (e.g., light emitting faces of the cold cathode lamps 200a and 200b) is parallel along the side face of the light guide plate 105. The side face of the light guide plate 105 serves as a light-incident face. The light guide plate 105 is made of transparent acrylic plastic or the like. The lamp reflector 201 is formed in a substantially U-shape. The lamp reflector 201 is open to a side facing the light guide plate 105. Specifically, the lamp reflector has a bottom face (e.g., bottom plate) 201a, front and rear faces (e.g., front and rear plates) 201b and 201c that extend from the bottom face 201a and 201b and a pair of wide components (e.g., support tabs) 401 that extends from lateral end portions of the front and bottom face 201a and 201b. The front and rear faces 201b and 201c extend upward with respect to the bottom face 201a to define an inner space therebetween for housing the cold cathode lamps 200a and 200b and the lamp sockets 203a and 203b. The lamp reflector 201 is open to the side locating neat the light guide plate 105 with respect to the cold cathode lamps 200a and 200b. The lamp reflector 201 is provided along the entire length of the linear cold cathode lamps 200a and 200b, which increases reflection efficiency. As a result, the light emitted by the cold cathode lamps 200a and 200b is guided to the light guide plate 105, and illuminates the liquid crystal display element 102 as planar light emitted from the light guide plate 105. Here, two cold cathode lamps 200a and 200b are provided in the lamp reflector 201. However, one or more of the cold cathode lamps can be disposed according to brightness required of the liquid crystal display device. The ends of the cold cathode lamps 200a and 200b are supported by the lamp sockets 203a and 203b. The lamp sockets 203a and 203b are fixed to both longitudinal ends of the lamp reflector 201.

The lamp cables 202a to 202d are connected to both ends of the cold cathode lamps 200a and 200b. The lamp cables 202a to 202d are used to supply power to the cold cathode lamps 200a and 200b. The lamp cables 202a to 202d are connected to the connectors 204. The connectors 204 are connected to a power supply of the liquid crystal display device (not shown). The lamp cable 202a is supported by the lamp socket 203a disposed on a one end portion of the lamp reflector 201 that is located closer to the connector 204. The lamp cable 202a is housed on a lower side of the lamp reflector 201, which is the side indicated by the arrow A. More specifically, the lamp cable 202a is disposed on the lower side of the bottom face 201a of the lamp reflector 201. The bottom face 201a of the lamp reflector 201 is located opposite to the side open to the light guide plate 105. Adhesive tape for supporting the lamp cable 202a can also be provided to the bottom face 201a of the lamp reflector 201. The lamp cable 202a housed on the bottom face 201a of the lamp reflector 201 is supported by the lamp socket 203b on the side farther away from the connector 204. The lamp cable 202a is bent back 180° and connected to one end of the cold cathode lamp 200a on an upper side of the lamp reflector 201 as indicated by the arrow B.

The lamp cable 202b is supported by the lamp socket 203a and connected to the other end of the cold cathode lamp 200a disposed on the upper side of the lamp reflector 201 as indicated by the arrow B. The other end of the cold cathode lamp 200a locates closer to the lamp socket 203a than the lamp socket 203b. Since two cold cathode lamps 200a and 200b are provided, another pair of the lamp cables 202c and 202d are accommodated in the lamp reflector 201 in the same manner as the above-mentioned lamp cables 202a and 202b and is connected to the cold cathode lamp 200b.

FIG. 3 is a detailed perspective view of the lamp unit 106 showing a situation prior to plugging the lamp socket 203a into the lamp reflector 201. The lamp socket 203a includes a main body 310, an extension body 311, a pair of first and second holders 301a and 301b, a pair of opening portions 302a and 302b, a pair of insertion portions 303a and 303b, a protrusion (e.g., convex portion) 304 and a prong 306. The main body 310 supports the cold cathode lamps 200a and 200b. The extension body 311 extends from a lower side of the main body 310. The first and second holders 301a and 301b are formed on the extension body 311. The first and second holders 301a and 301b hold and clamp the lamp cables 202a and 202c, respectively. Each of the first and second holders 301a and 301b has two legs to hold and clamp the lamp cables 202a and 202c. The first and second holders 301a and 301b are provided to the lower side of the lamp reflector 201 as indicated by the arrow A. Each of the first and second holders 301a and 301b includes a hole having a circular cross section whose diameter is substantially the same as or smaller than the diameter of the lamp cables 202a and 202c. The opening portions 302a and 302b is also formed on the extension body 311 for inserting the circular lamp cables 202a and 202c. Each of the opening portions 302a and 302b includes a slit formed along each of the holes of the first and second holders 301a and 301b to open the holes to a lower side of the lamp socket 203a. Each of the opening portions 302a and 302b further include convex portions along the slits for latching the lamp cables 202a and 202c inserted into the holes of the first and second holders 301a and 301b. The insertion portions 303a and 303b protrude in a cylindrical shape from an outer side face of the lamp socket 203a and have through holes, respectively. The insertion portions 303a and 303b are used for inserting and clamping the lamp cables 202b and 202d. The protrusion 304 is formed on a front face of the main body 310 of the lamp socket 203a. The protrusion 304 is inserted in the direction of the arrow B into the lamp reflector 201. Then, the protrusion 304 is engaged with a hole (e.g., positioning hole) 305 formed in the front face 201b of the lamp reflector 201. As a result, the lamp socket 203a is positioned and fixed. The prong 306 is provided to the lower side face of the extension body 311 of the lamp socket 203a. The prong 306 engages with the hole 109 provided to the frame 104 and positions and securely fixes the lamp socket 203a with respect to the backlight mechanism. More specifically, the lamp unit 106 is accurately positioned with respect to the frame 104 and the light guide plate 105. Furthermore, the cold cathode lamps 200a and 200b are positioned and securely fixed. As a result, the light is emitted in the optimal state for illuminating the liquid crystal display element 102.

FIG. 4 is a detailed perspective view of the lamp unit 106. The lamp cables 202a and 202c are pressed against the first and second holders 301a and 301b provided to the lamp socket 203a and opens up the opening portions 302a and 302b made of an elastic material. As a result, the lamp cables 202a and 202c are inserted into the first and second holders 301a and 301b. After insertion, the opening portions 302a and 302b are closed by the elastic force of the lamp socket 203a. Then, the lamp cables 202a and 202c are clamped. After this, the lamp socket 203a is plugged into the lamp reflector 201, and is fixed by the engagement of the protrusion 304 provided to the front face of the lamp socket 203a with the hole 305 provided to the front face 201b of the lamp reflector 201. The lamp cables 202a and 202c are disposed on the lower side of the lamp reflector 201 as indicated by the arrow A. The lamp cables 202b and 202d are inserted into the insertion portions 303a and 303b, respectively, and connected to one end of each of the cold cathode lamps 200a and 200b disposed on the upper side of the lamp reflector 201 as indicated by the arrow B.

The wide component 401 is provided on each of both end portions of the front and rear faces 201b and 201c of the lamp reflector 201. The wide components 401 forms wide portions on the end portions of the front and rear faces 201b and 201c that is wider than middle portions of the front and rear faces 201b and 201c. Each of the wide components 401 extends to the lower side beyond the bottom face 201a of the lamp reflector 201. The wide components 401 are formed in a shape corresponding to the extension body 311 of the lamp socket 203a to contact with the lamp socket 203a. Specifically, the wide components 401 sandwich the extension body 311 and the first and second holders 301a and 301b of the lamp socket 203a from above and below (from a front side and a rear side). In other words, the wide components 401 cover the extension body 311 from frontward and rearward. The wide components 401 contacts the extension body 311 to close the opening portions 302a and 302b. When the lamp cables 202a and 202c are inserted, the opening portions 302a and 302b of the lamp socket 203a are opened up because of the elastic force that is exerted. The opening force is squeezed from front and rear by the wide components 401. Then, the lamp socket 203a is held securely in the lamp reflector 201 by the squeezing force of the wide components 401 and by resistance produced by the elastic force of the opening portions 302a and 302b that tries to open in the opposite direction. After the lamp cables 202a and 202c are respectively inserted in the first and second holders 301a and 301b of the lamp socket 203a, the lamp socket 203a is plugged into the wide components 401 of the lamp reflector 201, which constantly presses the opening portions 302a and 302b in the closing direction. In the conventional lamp unit, when the lamp reflector is attached to the frame, a specific distance l is necessary between the lower face of the frame and the lower face of the lamp reflector in order to provide a gap for routing the lamp cables. With the lamp unit 106, the wide components 401 has the length l enough for routing the lamp cables 202a and 202b and required to cover the extension body 311 of the lamp socket 203a. As a result, the opening portions 302a and 302b of the lamp socket 203a can be pressed from frontward and rearward, and the lamp cables 202a and 202c can be clamped by the first and second holders 301a and 301b, which reliably prevents the lamp cables 202a and 202b from coming loose.

The structure of the lamp socket 203b disposed at the opposite end of the lamp socket 203a includes a main body, an extension body, a pair of first and second holders, a pair of opening portions and a protrusion. In view of the similarity between the lamp sockets 203a and 203b, the parts of the lamp socket 203b that are identical to the parts of the lamp socket 203a will be given the same name as the parts of the lamp socket 203a. Moreover, the descriptions of the parts of the lamp socket 203b that are identical to the parts of the lamp socket 203a may be omitted for the sake of brevity. Specifically, the lamp socket 203b also has the extension body. Furthermore, the lamp reflector 201 includes the wide components 401 to support the extension body of the lamp socket 203b from frontward and rearward.

Also, the ends of the lamp reflector of the conventional lamp unit are notched in order to support the lamp sockets. The wide components 401 of the lamp unit 106 are formed by utilizing the portion notched in the conventional lamp unit. Thus, it is possible to form the wide components 401 for securely supporting the lamp cables 202a and 202c without requiring any new members. In other words, the fixing of the lamp cables 202a and 202c can be accomplished securely and inexpensively.

The lamp unit 106 includes two cold cathode lamps 200a and 200b housed in a single lamp reflector 201, so a case of providing two first and second holders 301a and 301b is described. However, with a liquid crystal display device that needs to have higher brightness, the number of cold cathode lamps housed in the lamp reflector can be increased. Furthermore, the number of the holders for holding the lamp cables can also be suitably increased according to the number of the cold cathode lamps.

With the backlight mechanism, the lamp cables 202a and 202c are inserted through the opening portions 302a and 302b into the first and second holders 301a and 301b of the lamp socket 203a. Then, the extension body 311 is clamped between the wide components 401 of the lamp reflector 201. Thus, the opening portions 302a and 302b can be closed so that the lamp cables 202a and 202b are securely clamped. The lamp socket 203a is made from a rubber or urethane material with elasticity in order to maintain the supporting force when the lamp socket 203a is clamped into the lamp reflector 201. Furthermore, the lamp socket 203a is slightly wider than the lamp reflector 201 in which the lamp socket 203a is clamped. Thus, the lamp socket 203a is securely held by the resistance to the elastic force of the lamp socket 203a to the lamp reflector 201. Moreover, since the first and second holders 301a and 301b are also processed by molding the lamp socket 203a, the first and second holders 301a and 301b also has elasticity. Therefore, during insertion of the lamp cables 202a and 202c, the opening portions 302a and 302b is opened up, and automatically closes up after insertion. With the conventional lamp unit, the elasticity of the lamp socket is usually lost due to deterioration over time or by repeated plugging and unplugging of the lamp socket that is replaced at the same time as the cold cathode lamp. Then, the opening does not close with as much force, and instead remains open, which allows the lamp cable to come loose. Meanwhile, with the lamp unit 106, the lamp reflector 201 not only reflects light from the cold cathode lamps 200a and 200b, but also serves to protect the cold cathode lamps 200a and 200b. Since the lamp reflector 201 is usually made of a hard material such as metal, it is unlikely to lose much of the strength over time. With the lamp unit 106, the lamp reflector 201 includes the wide components 401 to support the lamp sockets 203a and 203b. Specifically, the wide components 401 sandwich the opening portions 302a and 302b of the lamp sockets 203a and 203b, and press the lamp sockets 203a and 203b so as to close off the opening portions 302a and 302b. Thus, even if the opening portions 302a and 302b lose the elasticity due to changes over time or due to repeated plugging and unplugging of the lamp sockets 203a and 203b, and lose the function of automatically closing, the opening portions 302a and 302b of the first and second holders 301a and 301b can still be securely closed by being sandwiched by the wide components 401 of the lamp reflector 201. As a result, the lamp cables 202a and 202c can be securely clamped.

With the backlight mechanism, the lamp reflector 201 can be slidably installed into and removed from the backlight mechanism by the sliding mechanism when all of the constituent members are supported between the frame 104 and the rear frame 108.

The sliding mechanism allows the lamp reflector 201 housing the cold cathode lamps 200a and 200b and the lamp cables 202a to 202d to be removable from the rear frame 108. Thus, the cold cathode lamps 200a and 200b can be separated along with the lamp reflector 201 from the rear frame 108 during lamp replacement. Therefore, the damage to the cold cathode lamps 200a and 200b can be prevented, and the replacement work can be made easier and safer.

With the backlight mechanism, the lamp reflector 201 has the hole 305. The lamp socket 203a has the protrusion 304 on the front face pressed by the lamp reflector 201. The protrusion 304 of the lamp socket 203a engages with the hole 305 in the lamp reflector 201.

With the backlight mechanism, the lamp socket 203a can be easily positioned. Thus, the cold cathode lamps 200a and 200b can be guided to the optimal irradiation position and securely supported by the lamp reflector 201. Furthermore, since the lamp socket 203a is completely contacted with the lamp reflector 201, the light from the cold cathode lamps 200a and 200b can be guided to the light guide plate 105 and the light leakage can be prevented.

With this backlight mechanism, the elastic material that makes up the lamp sockets 203a and 203b is rubber, silicone, or urethane.

Since the lamp sockets 203a and 203b are made of rubber, silicone, or urethane, elasticity is imparted to the first and second holders 301a and 301b. Then, the insertion of the lamp cables 202a and 202c into the first and second holders 301a and 301b can be made easy. As a result, the opening portions 302a and 302b can automatically close after insertion. Furthermore, the work of accommodating the lamp sockets 203a and 203b in the wide components 401 of the lamp reflector 201 can be made easy.

The present invention is favorable for liquid crystal display devices, and in particular is favorable for liquid crystal display devices in which the cold cathode lamp is easily installed and replaced.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal display device equipped with the present invention. Accordingly, these terms, as utilized to describe the present invention should be interpreted relative to a liquid crystal display device equipped with the present invention as used in the normal operating position.

While a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A lamp unit for a liquid crystal display device, comprising:
   a cold cathode lamp;
   a lamp cable electrically connected to the cold cathode lamp to supply electric power to the cold cathode lamp;
   a lamp socket supporting the cold cathode lamp, and having a holder portion holding the lamp cable, the lamp socket being made of an elastic material; and
   a lamp reflector housing the cold cathode lamp and the lamp socket, and the lamp reflector having a bottom plate, front and rear plates that extend from the bottom plate and a pair of support tabs that extends from lateral end portions of the front and rear plates to sandwich the holder portion of the lamp socket therebetween.

2. The lamp unit according to claim 1, wherein
   the elastic material of the lamp socket includes rubber, silicone or urethane.

3. A lamp unit for a liquid crystal display device, comprising:
   a cold cathode lamp;
   a lamp cable electrically connected to the cold cathode lamp to supply electric power to the cold cathode lamp;
   a lamp socket supporting the cold cathode lamp, and having a holder portion holding the lamp cable; and
   a lamp reflector housing the cold cathode lamp and the lamp socket, and the lamp reflector having a bottom plate, front and rear plates that extend from the bottom plate and a pair of support tabs that extends from lateral end portions of the front and rear plates to sandwich the holder portion of the lamp socket therebetween,
   the lamp socket further having a main body that supports the cold cathode lamp and an extension body that extends downward from the main body and that protrudes downward beyond the bottom plate of the lamp reflector, and
   the holder portion being formed on the extension body.

4. The lamp unit according to claim 3, wherein
   the lamp socket is integrally formed as a one-piece, unitary member.

5. A lamp unit for a liquid crystal display device, comprising:
   a cold cathode lamp;
   a lamp cable electrically connected to the cold cathode lamp to supply electric power to the cold cathode lamp;
   a lamp socket supporting the cold cathode lamp, and having a holder portion holding the lamp cable; and
   a lamp reflector housing the cold cathode lamp and the lamp socket, and the lamp reflector having a bottom plate, front and rear plates that extend from the bottom plate and a pair of support tabs that extends from lateral end portions of the front and rear plates to sandwich the holder portion of the lamp socket therebetween,
   the support tabs extending downward beyond the bottom plate to form wide portions on the lateral end portions of the front and rear plates with the wide portions being wider than middle portions of the front and rear plates.

6. The lamp unit according to claim 5, wherein
   the front and rear plates of the lamp reflector extend upward with respect to the bottom plate to define an internal space therebetween that houses the cold cathode lamp and the lamp socket.

7. The lamp unit according to claim 6, wherein
   the lamp reflector is integrally formed as a one-piece unitary member.

8. A lamp unit for a liquid crystal display device, comprising:
   a cold cathode lamp;
   a lamp cable electrically connected to the cold cathode lamp to supply electric power to the cold cathode lamp;
   a lamp socket supporting the cold cathode lamp, and having a holder portion holding the lamp cable; and
   a lamp reflector housing the cold cathode lamp and the lamp socket, and the lamp reflector having a bottom plate, front and rear plates that extend from the bottom plate and a pair of support tabs that extends from lateral end portions of the front and rear plates to sandwich the holder portion of the lamp socket therebetween,
   the front plate including a positioning hole that engages with a convex portion of the lamp socket that is formed on a front face of the lamp socket.

9. A liquid crystal display device comprising:

a lamp unit configured to emit light to an upper side of the liquid crystal display device and including a cold cathode lamp configured to emit the light;

a lamp cable electrically connected to the cold cathode lamp to supply electric power to the cold cathode lamp;

a lamp socket supporting the cold cathode lamp, and having a holder portion holding the lamp cable, the lamp socket being made of an elastic material; and a lamp reflector housing the cold cathode lamp and the lamp socket, and the lamp reflector having a bottom plate, front and rear plates that extend from the bottom plate and a pair of support tabs that extends from lateral end portions of the front and rear plates to sandwich the holder portion of the lamp socket therebetween;

a light guide plate disposed on an upper side of the lamp unit and configured to guide the light emitted by the lamp unit to a front side of the liquid crystal display device;

a reflective sheet disposed on a rear side of the light guide plate and configured to reflect the light emitted by the lamp unit;

an optical sheet disposed on a front side of the light guide plate and configured to diffuse or condense the light guided by the light guide plate;

a liquid crystal display element disposed on a front side of the optical sheet and configured to receive the light from the optical sheet;

front and rear frames housing the lamp unit, the light guide plate and the reflective sheet therebetween; and a bezel disposed on a front side of the liquid crystal display element to hold the optical sheet and the liquid crystal display element on the front frame.

10. The liquid crystal display device according to claim 9, wherein the rear frame is attached to the front frame by mating the rear frame to the front frame.

11. The liquid crystal display device according to claim 9, wherein the rear frame is attached to the front frame by fixing the rear frame to the front frame with a fixing member.

12. The liquid crystal display device according to claim 9, further comprising a lamp unit holder formed between the front and rear frames, and the lamp unit holder having an access opening through which the lamp unit is installed into and removed from the lamp unit holder.

* * * * *